United States Patent
Ha et al.

(10) Patent No.: US 10,447,041 B2
(45) Date of Patent: Oct. 15, 2019

(54) DYNAMIC LINE RATING DETERMINATION APPARATUS AND ASSOCIATED METHOD

(71) Applicant: General Electric Technology GmbH, Baden (CH)

(72) Inventors: Hengxu Ha, Stafford (GB); Deng Na, Stafford (GB)

(73) Assignee: General Electric Technology GmbH, Baden (CH)

(*) Notice: Subject to any disclaimer, the term of this patent is extended or adjusted under 35 U.S.C. 154(b) by 81 days.

(21) Appl. No.: 15/574,854

(22) PCT Filed: May 17, 2016

(86) PCT No.: PCT/EP2016/061026
§ 371 (c)(1),
(2) Date: Nov. 17, 2017

(87) PCT Pub. No.: WO2016/184857
PCT Pub. Date: Nov. 24, 2016

(65) Prior Publication Data
US 2018/0131189 A1  May 10, 2018

(30) Foreign Application Priority Data
May 18, 2015 (EP) .................................. 15275139

(51) Int. Cl.
*H02J 1/08* (2006.01)
*H02J 3/22* (2006.01)
(Continued)

(52) U.S. Cl.
CPC .................. *H02J 3/22* (2013.01); *H02J 3/00* (2013.01); *H02J 3/20* (2013.01);
(Continued)

(58) Field of Classification Search
None
See application file for complete search history.

(56) References Cited

U.S. PATENT DOCUMENTS 4,413,325 A * 11/1983 Elfner ...................... G01K 7/00
340/648
5,181,026 A * 1/1993 Granville ............. G01R 15/183
324/96
(Continued)

OTHER PUBLICATIONS

Extended European Search Report and Opinion issued in connection with corresponding EP Application No. 15275139.2 dated Oct. 30, 2015.
(Continued)

*Primary Examiner* — Lincoln D Donovan
*Assistant Examiner* — Khareem E Almo
(74) *Attorney, Agent, or Firm* — Eversheds-Sutherland (US) LLP (57) ABSTRACT

A dynamic line rating determination apparatus configured to control the current applied to a power line conductor by determining a dynamic maximum current rating for said power line conductor, based on measured voltage and current phase vectors taken at two temporally spaced sample times, the phase vectors including a voltage and current phase vector for each phase of electrical power carried by the power line conductor at a first and second end of the power line conductor; and determining the dynamic maximum current rating by; applying the phase vectors to a power line model to estimate the conductor temperature, applying the estimate to a thermal model to predict a steady state temperature that the power line conductor will reach, and calculate the dynamic maximum current rating based on the prediction of the steady state temperature, a power line conductor current, and a maximum temperature limitation value.

15 Claims, 3 Drawing Sheets

(51) Int. Cl.
*H02J 3/00* (2006.01)
*H02J 3/20* (2006.01)

(52) U.S. Cl.
CPC ... *H02J 2003/003* (2013.01); *H02J 2003/007* (2013.01); *Y02E 60/76* (2013.01); *Y04S 40/22* (2013.01)

(56) References Cited

U.S. PATENT DOCUMENTS

| | | | | |
|---|---|---|---|---|
| 5,933,355 A | | 8/1999 | Deb | |
| 6,236,949 B1* | | 5/2001 | Hart | G01R 15/183 324/126 |
| 6,313,752 B1* | | 11/2001 | Corrigan | H02H 7/263 324/76.13 |
| 6,476,521 B1* | | 11/2002 | Lof | H02J 3/24 307/102 |
| 6,545,482 B1* | | 4/2003 | Fedirchuk | G01R 19/2513 324/522 |
| 6,546,353 B1* | | 4/2003 | Hallett | G01W 1/14 702/130 |
| 6,598,003 B1* | | 7/2003 | Heino | G01R 19/2513 324/600 |
| 6,618,684 B1* | | 9/2003 | Beroset | G01R 11/185 702/99 |
| 7,593,747 B1* | | 9/2009 | Karam | G06F 1/3203 455/522 |
| 7,620,517 B2* | | 11/2009 | Scholtz | H02G 7/02 702/130 |
| 7,641,387 B2* | | 1/2010 | Engelhardt | G01C 9/00 374/110 |
| 9,519,014 B2* | | 12/2016 | Aaserude | G01R 27/02 |
| 9,634,516 B2* | | 4/2017 | Gale | B60L 3/04 |
| 2001/0021896 A1* | | 9/2001 | Bertsch | H02J 3/24 702/62 |
| 2002/0116139 A1* | | 8/2002 | Przydatek | G01D 4/004 702/62 |
| 2003/0014678 A1* | | 1/2003 | Ozcetin | G06F 1/14 713/400 |
| 2003/0101008 A1* | | 5/2003 | Hart | G01D 4/004 702/57 |
| 2003/0105608 A1* | | 6/2003 | Hart | G01D 4/004 702/122 |
| 2003/0200038 A1* | | 10/2003 | Schweitzer, III | H02H 1/0007 702/65 |
| 2004/0008461 A1* | | 1/2004 | Kojovic | H02H 3/28 361/62 |
| 2004/0010350 A1* | | 1/2004 | Lof | H02J 3/24 700/292 |
| 2004/0027748 A1* | | 2/2004 | Kojovic | H02H 3/28 361/62 |
| 2004/0172207 A1* | | 9/2004 | Hancock | G01R 19/2513 702/60 |
| 2005/0083206 A1* | | 4/2005 | Couch | G01D 21/00 340/657 |
| 2005/0222808 A1* | | 10/2005 | Zima | H02H 7/226 702/182 |
| 2005/0251296 A1* | | 11/2005 | Tracy Nelson | G06Q 10/06 700/292 |
| 2013/0066600 A1 | | 3/2013 | Rousselle et al. | |

OTHER PUBLICATIONS

International Search Report and Written Opinion issued in connection with corresponding PCT Application No. PCT/EP2016/061026 dated Jun. 24, 2016.

International Preliminary Report on Patentability issued in connection with corresponding PCT Application No. PCT/EP2016/061026 dated Nov. 21, 2017.

* cited by examiner

DYNAMIC LINE RATING DETERMINATION APPARATUS AND ASSOCIATED METHOD

FIELD OF INVENTION

This invention relates to an apparatus configured to determine a dynamic line rating comprising a dynamic maximum current that can be applied to a power line conductor. The invention also relates to an associated method and an electricity distribution and/or transmission grid including said apparatus.

BRIEF DESCRIPTION OF THE INVENTION

According to a first aspect of the invention we provide a dynamic line rating determination apparatus configured to provide for the control of the current applied to a power line conductor by determination of a dynamic maximum current rating for said power line conductor, the apparatus configured to; based on a set of measured voltage and current phase vectors taken at at least two, temporally spaced sample times, the voltage and current phase vectors comprising; a voltage phase vector for each phase of electrical power carried by the power line conductor at a first end of the power line conductor; a voltage phase vector for each phase of electrical power carried by the power line conductor at a second end of the power line conductor; a current phase vector for each phase of electrical power carried by the power line conductor at a first end of the power line conductor; and a current phase vector for each phase of electrical power carried by the power line conductor at a second end of the power line conductor; determine the dynamic maximum current rating by; applying said voltage and current phase vectors to a predetermined power line model to determine an estimate of the real time conductor temperature Tc, applying said estimate of the real time conductor temperature to a predetermined thermal model to determine a prediction of a steady state temperature that the power line conductor will reach over time, and calculating the dynamic maximum current rating based on at least said prediction of a steady state temperature, a power line conductor current, and a maximum temperature limitation value.

This is advantageous as the apparatus does not require measurement of ambient weather or environmental conditions or the measurement of the power line conductor temperature. Instead, through the use of the predetermined power line model and thermal model a surprisingly accurate and effective dynamic maximum current rating can be obtained. The apparatus only requires the measurement of voltage and current phasors for each phase at two disparate ends of the power line conductor, with then the real time conductor temperature, steady state conductor temperature and dynamic maximum current rating all being calculated based on said measured phasors.

Optionally, a set of positive sequence components, derived by a method of symmetrical components, of the voltage and current phase vectors is applied to the predetermined power line model, the set of positive sequence components comprising; a positive sequence voltage component for the first end; a positive sequence voltage component for the second end; a positive sequence current component for the first end; and a positive sequence current component for the second end.

Optionally, the set of positive sequence components are determined based on the following equation;

$$[\dot{V}_S \; \dot{I}_S \; \dot{V}_R \; \dot{I}_R] = \frac{1}{3}[1 \; \alpha \; \alpha^2] \begin{bmatrix} \dot{V}_{Sa} & \dot{I}_{Sa} & \dot{V}_{Ra} & \dot{I}_{Ra} \\ \dot{V}_{Sb} & \dot{I}_{Sb} & \dot{V}_{Rb} & \dot{I}_{Rb} \\ \dot{V}_{Sc} & \dot{I}_{Sc} & \dot{V}_{Rc} & \dot{I}_{Rc} \end{bmatrix}. \quad a$$

where,
$\dot{V}_S$ and $\dot{I}_S$ are the positive sequence voltage and current components of the first end;
$\dot{V}_R$ and $\dot{I}_R$ are the positive sequence voltage and current components of the second end;
$\dot{V}_{Sa}$, $\dot{V}_{Sb}$ and $\dot{V}_{Sc}$ are the voltage phase vectors for each phase a, b, c at the first end;
$\dot{I}_{Sa}$, $\dot{I}_{Sb}$, and $\dot{I}_{Sc}$ are the current phase vectors for each phase a, b, c at the first end;
$\dot{V}_{Ra}$, $\dot{V}_{Rb}$ and $\dot{V}_{Rc}$ are the voltage phase vectors for each phase a, b, c at the second end;
$\dot{I}_{Ra}$, $\dot{I}_{Rb}$, and $\dot{I}_{Rc}$ are the current phase vectors for each phase a, b, c at the second end;
$\alpha$ is an operator of the transformation where;

$$\alpha = e^{j\frac{2}{3}\pi}$$

and j is the imaginary unit.

It will be appreciated that although this example equation shows the determination of the positive sequence components for a three phase power system, the principle can be applied to any number of phases.

Optionally, the apparatus is configured to;
determine the estimate of the real time conductor temperature based on the predetermined power line model represented in the equation below;

$$\begin{bmatrix} \dot{V}_S \\ \dot{I}_S \end{bmatrix} = \begin{bmatrix} A(T_c) & B(T_c) \\ C(T_c) & D(T_c) \end{bmatrix} \begin{bmatrix} \dot{V}_R \\ \dot{I}_R \end{bmatrix}. \quad i$$

For example, if an equivalent PI section model is used as the power line model, then the parameters A(Tc), B(Tc), C(Tc) and D(Tc) can be expressed as below:

$A(T_c) = D(T_c) = \cos h(\gamma l)$ $B(T_c) = Z_c \sin h(\gamma l), C(T_c) = \sin h(\gamma l)/Z_c$ $l(T_c) = l(T_{REF})(1+\varepsilon)$ $\gamma(T_c) = \sqrt{(r(T_{REF})(1+\varepsilon)(1+\alpha(T_c-T_{REF}))+j\omega L_u)(j\omega C_u)}$ $Z_c(T_c) = \sqrt{((r(T_{REF})(1+\varepsilon)(1+\alpha(T_c-T_{REF}))+j\omega L_u))/(j\omega C_u)}$ In one or more embodiments, $\gamma$ and $Z_c$ may alternatively be determined by the following equations:

$\gamma = \sqrt{(r+j\omega L_u)(j\omega C_u)}$ $Z_c = \sqrt{(r+j\omega L_u)/(j\omega C_u)}$ and
$\gamma$ is the propagation constant of the power line conductor;
l is a length of the power line conductor;
r is series resistance per unit length of the power line conductor;
$\omega$ is frequency in radians where $\omega = 2\pi f$;
$Z_c$ is a characteristic impedance of the power line conductor;

$T_{REF}$ is a reference conductor temperature and $r(T_{REF})$ is the resistance per unit length of the power line conductor at the temperature of $T_{REF}$;

ε is a predetermined elongation parameter of the power line conductor; and j is the imaginary unit, ω is the angular velocity of the voltage/current where ω=2πf;

$L_u$ is the (series) inductance per unit length of the power line conductor; and $C_u$ is the (shunt) capacitance per unit length of the power line conductor.

Optionally, the apparatus is configured to determine the elongation parameter by any one of the following methods;

$$\varepsilon = \frac{F}{A \cdot E} + (\beta_1(T_c - T_{REF}) + \beta_2(T_c - T_{REF})^2); \text{ and}$$

$$\varepsilon = \frac{F}{A \cdot E} + \beta_1(T_c - T_{REF})$$

where

F is the mechanical force that is being applied on the conductor, measured in Newtons (for example, F can be regarded as the gravitational force due to weight of the conductor between two pylons, which is calculated approximately by dividing the total gravitational force on the cable due to its total weight by the number of sections);

A is the cross-sectional area in mm² of the power line conductor;

E is the elasticity modulus in Nmm$^{-2}$ of the power line conductor;

$\beta_1$ is the linear thermal expansion coefficient in K$^{-1}$ of the power line conductor; and $\beta_2$ is the square thermal expansion coefficient in K$^{-2}$ of the power line conductor.

Optionally, based on the power line model, the estimate of the real time conductor temperature $T_c$ is derived using a non-linear least squares method such as the Newton's method.

The power line conductor current may be an average power line conductor current.

Optionally, the apparatus is configured to determine the power line conductor current, I, as an average power line conductor current, by the following equation;

$$I = \left(\dot{I}_S - \frac{Y'}{2}\dot{V}_S + \dot{I}_R + \frac{Y'}{2}\dot{V}_R\right)\bigg/2$$

or by a simplified equation;

$$I = (\dot{I}_S + \dot{I}_R)/2$$

where, $\dot{V}_S$ and $\dot{I}_S$ are the positive sequence voltage and current of the first end;

$\dot{V}_R$ and $\dot{I}_R$ are the positive sequence voltage and current of the second end; and $$Y' = \frac{2}{Z_c}\tanh\left(\frac{\gamma l}{2}\right)$$

$$\gamma(T_c) = \sqrt{(r(T_{REF})(1+\varepsilon)(1+\alpha(T_c - T_{REF})) + j\omega L_u)(j\omega C_u)}$$

$$Z_c(T_c) = \sqrt{((r(T_{REF})(1+\varepsilon)(1+\alpha(T_c - T_{REF})) + j\omega L_u))/(j\omega C_u)}$$

In one or more embodiments, γ and $Z_c$ may alternatively be determined by the following equations:

$$\gamma = \sqrt{(r + j\omega L_u)(j\omega C_u)}$$

$$Z_c = \sqrt{(r + j\omega L_u)/(j\omega C_u)}$$

γ is the propagation constant of the power line conductor;

$Z_c$ is a characteristic impedance of the power line conductor r is series resistance per unit length of the power line conductor;

ω is frequency in radians where ω=2πf, $L_u$ is the (series) inductance per unit length of the power line conductor;

$C_u$ is the (shunt) capacitance per unit length of the power line conductor.

Tc has already been obtained by the previous step.

Optionally, the apparatus is configured to apply said estimate of the real time conductor temperature to the predetermined thermal model to determine a prediction of a steady state temperature that the power line conductor will reach over time comprises; determining a time constant representative of a predicted change in real time conductor temperature over time based on a time derivative of at least two calculated real time conductor temperatures at different times and using said time constant to determine the steady state temperature.

The different times may be a current time and a previous time.

Determining the time derivative of the real time conductor temperature may comprise using the following formula;

$$T'_c(k) = \frac{T_c(k) - T_c(k-1)}{T_{s1}}$$

where $T_{s1}$ is the time interval between the $T_c(k-1)$th and $T_c(k)$th value, comprising a predetermined primary execution time interval (for example, $T_{s1}$ may be selected as 5 s);

$T_c(k)$ is the conductor temperature at $k^{th}$ time interval (present time);

$T_c(k-1)$ is the conductor temperature at $(k-1)^{th}$ time interval (previous time); and $T'_c(k)$ is the derivative of $T_c(k)$.

Calculating the time constant α may comprise any one of the following methods; Using the equation;

$$\alpha(k) = -\frac{T'_c(k) - T'_c(k-1)}{T_{cv}(k) - T_{cv}(k-1)}$$

Using the equation;

$$\alpha(k) = -\frac{2}{T_{S2}} \cdot \frac{T_c(k) + T_c(k-2) - 2T_c(k-1)}{T_c(k) - T_c(k-2)}$$

where $T_{s2}$ is a predetermined secondary execution time interval. For example, $T_{s2}$ may be selected as 10 s;

k is the present time sample and k−1 is the previous sample, which are within the secondary execution time interval $T_{s2}$; and $$T_{cv}(k) = \frac{T_c(k) + T_c(k-1)}{2}$$

where $T_{cv}(k)$ is the mean average real time conductor temperature taken as an average of the temperature at the present time, k, and previous time k−1.

Optionally, the apparatus is configured to determine the steady state conductor temperature $T_{css}$ by the following process;

If $|\Delta T_c| < \varepsilon$ $$T_{css}(k) = T_{cv}(k)$$

else $$T_{css}(k) = \frac{1}{\alpha(k)} T'_c(k) + T_{cv}(k)$$

where $\Delta T_c$ is the difference between two successively calculated real time conductor temperature values, $T_c$, $$\Delta T_c = T_{cv}(k) - T_{cv}(k-1)$$

$\varepsilon$ is a predetermined threshold value representative of a limit in the change of conductor temperature for there to be deemed a steady state condition has been reached;

$T'_c(k)$ is a time derivative of $T_c(k)$, the predicted real time conductor temperature at time k. It will be appreciated that the k and k−1 make reference to the associated values at the present and a previous time, which in this instance is based on the secondary execution time interval.

The apparatus may be configured to verify the acceptability of the predicted steady state conductor temperature $T_{css}(k)$, comprising;

If $T_{css}(k) \in [T_{css\_min}, T_{css\_max}]$, then the calculation result of $T_{css}(k)$ is acceptable;

If not, then $T_{css}(k)$ maintains its previous historical value;

$$T_{css}(k) = T_{css}(k-1)$$

where $[T_{css\_min}, T_{css\_max}]$ is a predetermined threshold range of $T_{css}$.

Optionally, the apparatus is configured to calculate the dynamic maximum current rating based on one or more of the following; the predicted steady state temperature value $T_{css}$ relative to the predetermined maximum conductor temperature limitation value $T_{max}$; the difference between a predetermined maximum conductor temperature limitation value $T_{max}$ and a first (initial) steady state temperature value $T_{c0}$, relative to the difference between a subsequent (current) steady state temperature value and the first (initial) steady state temperature value $T_{c0}$; the difference between a predetermined maximum conductor temperature limitation value $T_{max}$ and a first steady state temperature value $T_{css}(k-g)$, where g is an integer, relative to the difference between a subsequent steady state temperature value $T_{css}(k)$ and the first steady state temperature value and a change in an average conductor current, I, between the time of the first steady state temperature value and the time of the subsequent steady state temperature value.

Optionally, the apparatus is configured to calculate the dynamic maximum current rating, $I_{max}(k)$, based on one or more of the following equations;

$$I_{max}(k) = \sqrt{\frac{I_k^2 (T_{max} - T_{c0}(k-1))}{T_{css}(k) - T_{c0}(k-1)}}$$

$$I_{max}(k) = \sqrt{I_k^2 + \frac{I_k^2 - I_{k-1}^2}{T_{css}(k) - T_{css}(k-1)} (T_{max} - T_{css}(k))}$$

where $T_{max}$ is a predetermined maximum allowable conductor temperature (the limitation value), $T_{css}(k)$ is the calculated steady state conductor temperature at $(k)^{th}$ time interval, $T_{c0}$ is the initial steady state conductor temperature when there is no current flowing in the power line, and k is an average conductor current at a $k^{th}$ time interval, $I_{k-1}$ is an average conductor current at a subsequent $(k-1)^{th}$ time interval. It will be appreciated that the k and k−1 make reference to the associated values at the present and a previous time interval, which in this instance is based on a predetermined tertiary execution time interval $T_{S3}$. For example, $T_{s3}$ may be selected as 20 s.

Optionally, the apparatus is configured to calculate the dynamic maximum current rating, $I_{max}$, based on; determination of one or more of the following variables for use as judgment conditions in one or more of three different cases, wherein, $\Delta I$ is a difference between two successively determined average conductor currents, where k−1 represents a first determined value and k a subsequent determined value;

$$\Delta I = I_k - I_{k-1}$$

$\Delta T_{css}$ is a difference between two successively determined steady state conductor temperatures where k−1 represents a first determined value and k a subsequent determined value;

$$\Delta T_{css} = T_{css}(k) - T_{css}(k-1)$$

$T_{c0}$ is an initial steady state conductor temperature when there is no current flowing in the power line;

$\Delta T_{c0}$ is the difference between two successive initial steady state conductor temperature, $$\Delta T_{c0} = T_{c0}(k) - T_{c0}(k-1)$$

$\varepsilon 1$, $\varepsilon 2$, $\varepsilon 3$ and $\varepsilon 4$ are all predetermined threshold values that control the determination of $I_{max}$; and the dynamic maximum current rating $I_{max}$ is calculated by one or more of the following equations;

if $|\Delta I| \leq \varepsilon 1$, $I_{max}(k)$ is calculated using the following equation:

$$I_{max}(k) = \sqrt{\frac{I_k^2 (T_{max} - T_{c0}(k-1))}{T_{css}(k) - T_{c0}(k-1)}}$$

in the equation, $T_{max}$ is the maximum allowable conductor temperature, $T_{css}(k)$ is the calculated steady state conductor temperature at $(k)^{th}$ time interval, and $I_k$ is the average conductor temperature at $(k)^{th}$ time interval;

If $|\Delta I| \geq \varepsilon 1$ and $|\Delta T_{css}| \leq \varepsilon 2$, $I_{max}(k)$ maintains the historic value;

$$I_{max}(k) = I_{max}(k-1)$$

If $|\Delta I| \geq \varepsilon 1$ and $|\Delta Tcss| \geq \varepsilon 2$ the maximum current rating $I_{max}(k)$ is calculated using the following equation:

$$I_{max}(k) = \sqrt{I_k^2 + \frac{I_k^2 - I_{k-1}^2}{T_{css}(k) - T_{css}(k-1)} (T_{max} - T_{css}(k))}$$

The value of $T_{c0}(k)$ may be also updated using the equation below:

$$T_{c0}(k) = T_{css}(k) - \frac{I_k^2(T_{css}(k) - T_{css}(k-1))}{I_k^2 - I_{k-1}^2}$$

Optionally, the apparatus is configured to check that the calculated dynamic maximum current rating $I_{max}(k)$ value lies within predetermined bounds prior to the apparatus providing it for control of current applied to the power line conductor.

According to a second aspect we provide a method of providing for the control of the current applied to a power line conductor by determination of a dynamic maximum current rating for said power line conductor, the method comprising; based on a set of measured voltage and current phase vectors taken at at least two, temporally spaced sample times, the voltage and current phase vectors comprising; a voltage phase vector for each phase of electrical power carried by the power line conductor at a first end of the power line conductor; a voltage phase vector for each phase of electrical power carried by the power line conductor at a second end of the power line conductor; a current phase vector for each phase of electrical power carried by the power line conductor at a first end of the power line conductor; and a current phase vector for each phase of electrical power carried by the power line conductor at a second end of the power line conductor; determining the dynamic maximum current rating by; applying said set of voltage and current phase vectors to a predetermined power line model to determine an estimate of the real time conductor temperature, applying said estimate of the real time conductor temperature to a predetermined thermal model to determine a prediction of a steady state temperature that the power line conductor will reach over time, and calculating the dynamic maximum current rating based on at least said prediction of the steady state temperature, a power line conductor current, and a maximum temperature limitation value.

According to a further aspect we provide a computer readable medium or computer program comprising computer code configured to, when executed by a processor having memory, perform the method of the second aspect.

According to a further aspect of the invention we provide an electricity distribution grid or an electricity transmission grid including at least one power line conductor for carrying electrical power around said grid, the grid including the apparatus of the first aspect for controlling the power applied to said at least one power line conductor.

BRIEF DESCRIPTION OF THE DRAWINGS

There now follows, by way of example only, a detailed description of embodiments of the invention with reference to the following figures, in which.

DETAILED DESCRIPTION

Figure 2:
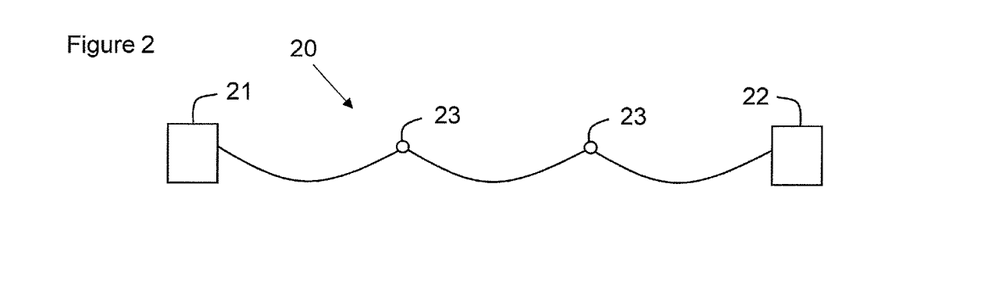
FIG. 2 shows a power line conductor between a first end and a second end.

FIG. 2 shows a power line conductor comprising a length of an electrical conductor. The power line may be an overhead line and/or an underground cable. The maximum current that may be passed along the power line is termed the maximum current rating of the power line and it is limited by the maximum conductor temperature which is allowed on the power line. The temperature of the power line affects it strength and the amount it may sag from pylons, for example, which must be controlled to ensure the power line remains within safe operating limits. Exceeding the maximum conductor temperature may result in annealing of conductor material thereby causing permanent damage to the power line. The maximum conductor temperature may comprise a predetermined value based on the physical dimensions and material of the power line and how it is supported. The conductor temperature is a function of at least the current flowing through the power line and environmental conditions, such as the ambient temperature, wind speed, wind direction and incident solar radiation. The conventional maximum current rating may be determined based on "worst case" environmental conditions where the environment contributes a substantial amount to the conductor temperature therefore resulting in a relatively low maximum current rating to ensure the maximum conductor temperature is not exceeded. The maximum current rating calculated by this method is termed the static line rating. In practice, the environmental conditions may be rarely close to the "worst case" situation and therefore the maximum current rating determined by the static line rating method may be overly conservative for much of the time. Thus, the capacity of the power line may be under used.

Determination of the maximum current rating based on actual environmental conditions at the present time rather than a "worst case" situation may provide for improved utilization of power line capacity. Therefore, the maximum current rating may increase if the environmental conditions contribute less to the conductor temperature and decrease if the environmental conditions contribute more to the conductor temperature. The maximum current rating determined by this method is termed the dynamic line rating.

Actively monitoring the conductor temperature to determine if the maximum current rating can be increased or should be decreased typically requires many measurement units situated along the power line to collect environmental information and/or the temperature of the conductor. The use of many measurement units increases the capital cost and the maintenance cost of dynamic line rating installations.

Figure 1:
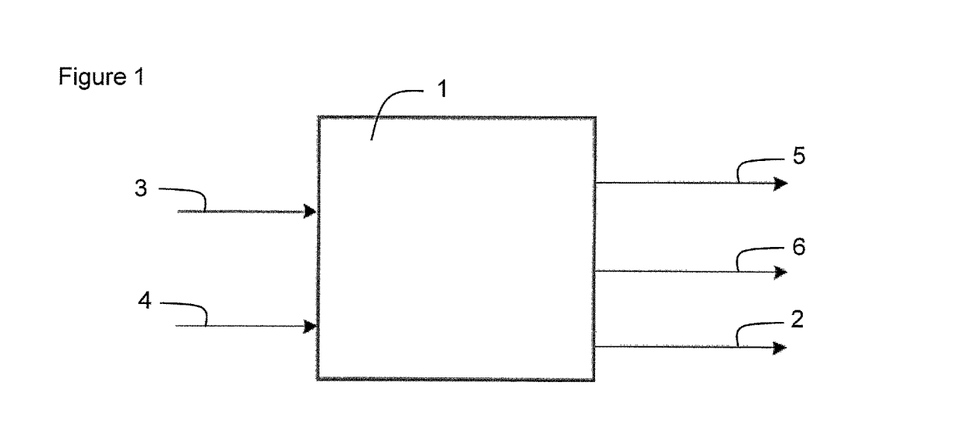
FIG. 1 shows an example dynamic line rating determination apparatus.

FIG. 1 shows a dynamic line rating apparatus 1 configured to provide a dynamic maximum current rating 2 for a power line section 20 (shown in FIG. 2) having a first end 21 and a second end 22. The power line section 20 may comprise a length of electrical conductor and may form part of an electricity distribution grid or an electricity transmission grid. The power line section may be supported along its length by support structures, such as pylons 23. The maximum current rating 2 is based on measurements 3 of voltage and current flow at the first end 21 of the power line section 20 and measurements 4 of voltage and current flow at the second end 22 of the power line section 20.

A method of determining the dynamic maximum current rating based only on the measurements 3, 4 and predetermined modelling of the power line conductor will be described below.

In addition to the dynamic maximum current rating 2, the apparatus is configured to provide other variables such as an estimated real time conductor temperature 5 and a predicted steady state conductor temperature 6. The estimated real time conductor temperature 5 and the predicted steady state conductor temperature 6 are calculated based on the measurements 3, 4 and predetermined modelling of power lines. Thus, environmental condition measurement sensors are not required, nor are power line temperature sensors. The steady state conductor temperature comprises the temperature the power line conductor will ultimately reach after a change in current flow through said power line. Thus, the change in conductor temperature in response to a step change in current flow may not occur instantaneously but may reach a substantially constant "steady state conductor temperature" after a period of time in the future. Thus, the steady state conductor temperature comprises a prediction of the temperature the conductor will reach assuming steady state current/power flow and environmental conditions.

Figure 3:
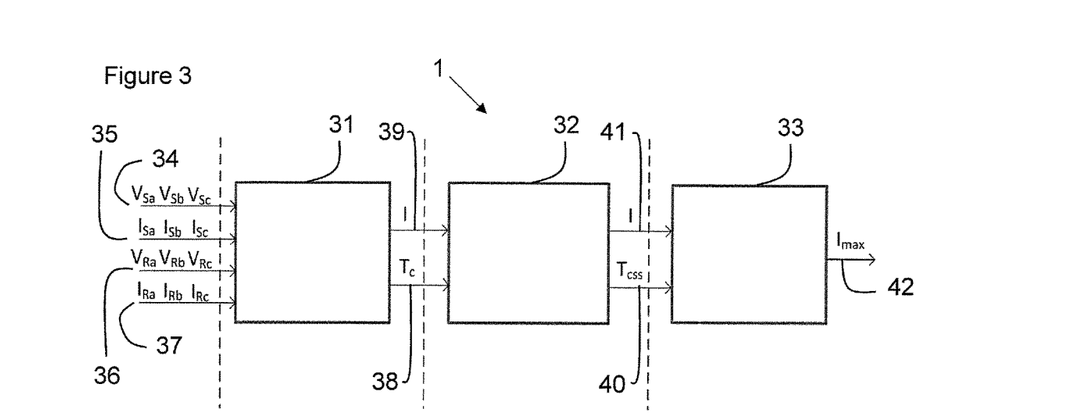
FIG. 3 shows a more detailed schematic view of the dynamic line rating determination apparatus of FIG. 1.

FIG. 3 shows a schematic diagram of the dynamic line rating apparatus 1 comprising three stages 31, 32, 33. The first stage 31 comprises determination of the real time conductor temperature, Tc, of the power line section 20 and the average current flowing, I, flowing through the power line section 20. Thus, the first stage 31 comprises the real time conductor temperature determination stage.

For any power line section 20, either end 21, 22 can be defined as the sending end and, accordingly, the other end is the receiving end. Hereinafter, the first end 21 will be referred to as the sending end and the second end 22 will be referred to as the receiving end, although it will be appreciated that in other examples this could be reversed. The first stage 31 is configured to receive: a set of voltage phasors (phase vectors) 34 for each phase measured at the sending end 21; a set of current phasors 35 for each phase measured at the sending end 21; a set of voltage phasors (phase vectors) 36 for each phase measured at the receiving end 22; and a set of current phasors 37 for each phase measured at the receiving end 22.

$\dot{V}_{Sa}$, $\dot{V}_{Sb}$ and $\dot{V}_{Sc}$ represent three phase voltage phasors of the sending end 21 of a three phase (phase a, phase b and phase c) system. It will be appreciated that the apparatus 1 may be applied to systems that utilize greater or fewer than three phases. Further, correspondingly, $\dot{I}_{Sa}$, $\dot{I}_{Sb}$ and $\dot{I}_{Sc}$ represent three phase current phasors as measured at the sending end 21. Further, $\dot{V}_{Ra}$, $\dot{V}_{Rb}$ and $\dot{V}_{Rc}$ represent three phase voltage phasors as measured at the receiving end 22. Further, $\dot{I}_{Ra}$, $\dot{I}_{Rb}$ and $\dot{I}_{Rc}$ represent three phase current phasors as measured at the receiving end 22. These voltage and current phasors are in this example sampled at a sampling period $T_{sample}$, which may be every 20 ms, although other sampling periods may be used. The determination of the real time conductor temperature Tc is provided every $T_{s1}$ seconds where $T_{s1}$ is greater than the voltage and current phasor sampling period (20 ms in this example). The determination of $T_C$ and an average conductor current I from these voltage and current measurements will be described below. The first stage 31 provides $T_C$ as output 38 and I as output 39.

The second stage 32 comprises a steady state conductor temperature determination stage. The second stage 32 is configured to determine the steady state conductor temperature, $T_{css}$, based on only the average current I and the estimated real time conductor temperature Tc. The determination of $T_{css}$ is provided every $T_{s2}$ seconds where $T_{s2}$ is greater than $T_{s1}$. The second stage 32 provides $T_{css}$ as output 40 and relays I from the first stage as output 41.

The third stage 33 comprises a dynamic maximum current rating determination stage. The third stage 33 is configured to determine the dynamic maximum current rating, $I_{max}$, based on the steady state conductor temperature, $T_{CSS}$, determined by the second stage 32 and the average current, I, determined by the first stage 31. Thus, the only actively measured variables used by the apparatus comprise the voltage and current phasors obtained in the first stage 31. The third stage 33 provides $I_{max}$ as output 42. In FIG. 3, the third stage is shown as only providing $I_{max}$. $I_{max}$ may be provided for control of power flow across the power line section 20. However, as shown in FIG. 1, the apparatus 1 may additionally provide the real time conductor temperature $T_c$ and/or the steady state conductor temperature $T_{css}$ as output. The determination of $I_{max}$ is provided every $T_{s3}$ seconds where $T_{s3}$ is greater than $T_{s2}$. For example, in the present example, $T_{s1}$=5 sec., $T_{s2=10}$ sec., and $T_{s3}$=20 sec.

In the first stage 31, the real time conductor temperature is evaluated based on the measured voltages and currents from both ends of the power line by solving a power line model equation using the voltage and current phasors as input. In particular, the power line model equation may comprise a transmission equation of a power line using these voltage and current phasors as input. The voltage and current transmitting from one end to another are relative to the line parameters, which are functions of the line temperature, for example. Series impedance and shunt admittance of the line may be functions of the conductor temperature. Therefore, the conductor temperature can be obtained by directly solving the transmission equation of a line, in which the voltage and currents are known quantities and the temperature is unknown variable. A Newton's method may be utilized to derive the real time conductor temperature $T_c$ from the transmission line equation. The average conductor current I may be derived based on positive sequence components $I_S$ and $I_R$ for each phase or, in other examples, is received from a different apparatus.

In second stage 32, the steady state conductor temperature is determined based on the real time conductor temperature derived from the first stage by using a predetermined power line thermal model.

In the third stage 33, the maximum current rating is determined based on the steady state conductor temperature derived from the second stage and the average conductor current, as described in more detail below.

The First Stage 31

Figure 4:
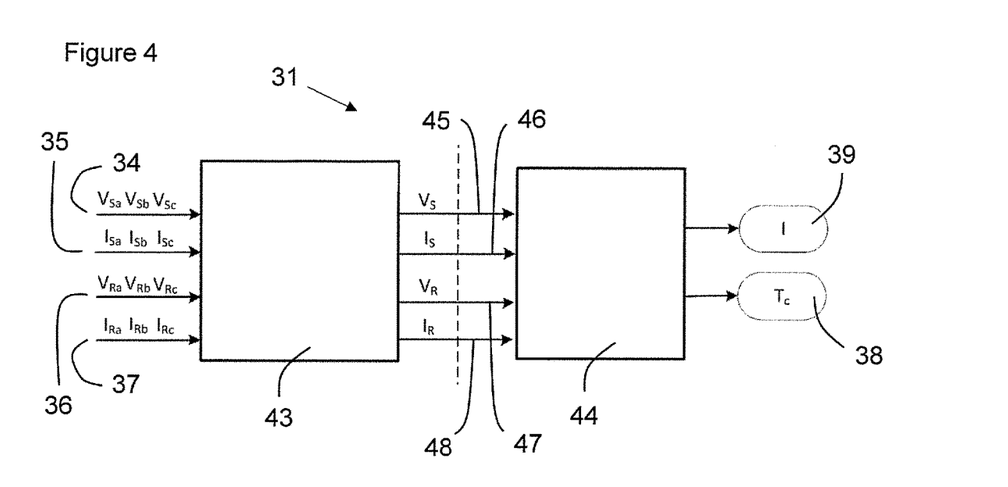
FIG. 4 shows a more detailed schematic view of the first stage shown in FIG. 3.

FIG. 4 shows a more detailed conceptual view of the first stage 31. The first stage 31 comprises a symmetrical components determination element 43 and a power line model determination element 44. The symmetrical components determination element 43 is configured to determine a positive sequence component from the twelve voltage and current phase phasor values 34, 35, 36, 37 measured at the sending and receiving ends 21, 22. In particular, the symmetrical components determination element 43 is configured to determine a positive sequence voltage term for the first (sending) and second (receiving) ends 20, 21 and a positive sequence current term for the first (sending) and second (receiving) ends 20, 21. Thus, four positive sequence components 45, 46, 47, 48 are determined.

The power line model element 44 is configured to receive the positive sequence components 45, 46, 47, 48 from element 43 and solve an equation of a predetermined power line model, as described below, to determine an estimate of the real time conductor temperature 38. The power line model element 44 or a further calculation block (not shown in this example) may be configured to determine the average conductor current, I, shown output at 39.

The positive-sequence components $\dot{V}_S$, $\dot{I}_S$, $\dot{V}_R$ and $\dot{I}_R$ are derived in element 43 using the following equation;

$$[\dot{V}_S \ \dot{I}_S \ \dot{V}_R \ \dot{I}_R] = \frac{1}{3}[1 \ \alpha \ \alpha^2]\begin{bmatrix} \dot{V}_{Sa} & \dot{I}_{Sa} & \dot{V}_{Ra} & \dot{I}_{Ra} \\ \dot{V}_{Sb} & \dot{I}_{Sb} & \dot{V}_{Rb} & \dot{I}_{Rb} \\ \dot{V}_{Sc} & \dot{I}_{Sc} & \dot{V}_{Rc} & \dot{I}_{Rc} \end{bmatrix}$$

where,
$\dot{V}_S$ and $\dot{I}_S$ are the positive sequence voltage and current of the sending end;
$\dot{V}_R$ and $\dot{I}_R$ are the positive sequence voltage and current of the receiving end;
$\dot{V}_{Sa}$, $\dot{V}_{Sb}$ and $\dot{V}_{Sc}$ are the voltage phase vectors for each phase a, b, c at the first end;
$\dot{I}_{Sa}$, $\dot{I}_{Sb}$, and $\dot{I}_{Sc}$ are the current phase vectors for each phase a, b, c at the first end;
$\dot{V}_{Ra}$, $\dot{V}_{Rb}$ and $\dot{V}_{Rc}$ are the voltage phase vectors for each phase a, b, c at the second end;
$\dot{I}_{Ra}$, $\dot{I}_{Rb}$, and $\dot{I}_{Rc}$ are the current phase vectors for each phase a, b, c at the second end;
α is operator of the transformation; and $$\alpha = e^{\frac{2}{3}\pi j}$$

j is the imaginary part unit.

The determination of the estimated real time conductor temperature is determined by the element 44 based on a power line model represented in equation 1 below, which is derived based on FIG. 5.

$$i \cdot \begin{bmatrix} \dot{V}_S \\ \dot{I}_S \end{bmatrix} = \begin{bmatrix} A(T_c) & B(T_c) \\ C(T_c) & D(T_c) \end{bmatrix} \begin{bmatrix} \dot{V}_R \\ \dot{I}_R \end{bmatrix} \quad \text{(Eq 1)}$$

For example, if an equivalent PI section model is used as the power line model, then the parameters of A(Tc), B(Tc), C(Tc) and D(Tc) can be expressed as below:

$A(T_c)=D(T_c)=\cos h(\gamma l)$ $B(T_c)=Z_c \sin h(\gamma l), C(T_c)=\sin h(\gamma l)/Z_c$ $l(T_T)=l(T_{REF})(1+\varepsilon)$ $\gamma(T_c)=\sqrt{(r(T_{REF})(1+\varepsilon)(1+\alpha(T_c-T_{REF}))+j\omega L_u)(j\omega C_u)}$ $Z_c(T_c)=\sqrt{((r(T_{REF})(1+\varepsilon)(1+\alpha(T_c-T_{REF}))+j\omega L_u))/(j\omega C_u)}$ In one or more embodiments, γ and $Z_c$ may alternatively be determined by the following equations:

$\gamma=\sqrt{(r+j\omega L_u)(j\omega C_u)}$ $Z_c=\sqrt{(r+j\omega L_u)/(j\omega C_u)}$ γ is the propagation constant;
l is the length of the power line section 20;
r is series resistance per unit length of the power line section 20;

$Z_c$ is the characteristic impedance of the power line section 20;
$T_{REF}$ is the reference conductor temperature. For example, normally, $T_{REF}$ may be selected at 20° C. and r($T_{REF}$) is the resistance per unit length at the temperature of $T_{REF}$;
ε is the elongation of the power line section 20.
j is the imaginary part unit,
ω is the angular frequency of the voltage/current.

$$w=2\pi f$$

$L_u$ is the inductance per unit length of the power line conductor.
$C_u$ is the capacitance per unit length of the power line conductor.

The elongation may be determined by;

$$\varepsilon = \frac{F}{A \cdot E} + \beta_1(T_c - T_{REF}) + \beta_2(T_c - T_{REF})^2$$

Or, in a simplified expression, as follows;

$$\varepsilon = \frac{F}{A \cdot E} + \beta_1(T_c - T_{REF})$$

Or, ε can also be evaluated approximately according to the material of the conductor and may thus comprise a predetermined quantity.
where
F is the mechanical force that is being applied on the conductor, measured in Newtons (for example, F can be regarded as the gravitational force due to weight of the conductor between two pylons, which is calculated approximately by dividing the total gravitational force on the cable due to its total weight by the number of sections);
A is the cross-sectional area in mm² of the power line conductor;
E is the elasticity modulus in Nmm⁻² of the power line conductor;
$\beta_1$ is the linear thermal expansion coefficient in K⁻¹ of the power line conductor; and
$\beta_2$ is the square thermal expansion coefficient in K⁻² of the power line conductor.

Based on the power line model above of Equation 1, the conductor temperature $T_c$ can be derived using a Newton's method. It will be appreciated that other methods applicable to solving non-linear least squares problems may be used. Firstly, the power line model (Equation 1) is rewritten into real number equations.

$$i \cdot Y = \begin{bmatrix} \text{Re}(\dot{V}_S) \\ \text{Im}(\dot{V}_S) \\ \text{Re}(\dot{I}_S) \\ \text{Im}(\dot{I}_S) \end{bmatrix} = F(T_c) = \begin{bmatrix} \text{Re}(f_1(\dot{V}_R, \dot{I}_R, T_c)) \\ \text{Im}(f_1(\dot{V}_R, \dot{I}_R, T_c)) \\ \text{Re}(f_2(\dot{V}_R, \dot{I}_R, T_c)) \\ \text{Im}(f_2(\dot{V}_R, \dot{I}_R, T_c)) \end{bmatrix} \quad \text{(Eq 2)}$$

where, $f_1=(\dot{V}_R, \dot{I}_R, T_c)=A(T_c)\dot{V}_R+B(T_c)\dot{I}_R$ $f_2=(\dot{V}_R, \dot{I}_R, T_c)=C(T_c)\dot{V}_R+D(T_c)\dot{I}_R$ Then the conductor temperature $T_c$ is calculated using the method below.

Select an initial value for $T_c$: $T_c^{(0)}$

Calculate $\Delta Y$ $$\Delta Y(T_c^{(0)})=Y-F(T_c^{(0)})$$

Calculate J $$J(T_c^{(0)}) = \frac{d\Delta Y(T_c)}{dT_c}\bigg|\, T_c = T_c^{(0)}$$

Calculate $\Delta T_c$.

$$\Delta T_c(T_c^{(0)})=(J^TJ)^{-1}J^T\Delta Y$$

Revise the value of $T_c$ by $$T_c^{(1)}=T_c^{(0)}+\Delta T_c(T_c^{(0)})$$

Check if the following condition is reached. If the condition is reached, then proceed to step (7); If the condition is not reached, return to step (2) by replacing $T_c^{(0)}$ with $T_c^{(k)}$ while Y is not changed;

$$|\Delta Y(T_c^{(k)})|\leq \delta$$

In this way, the real time conductor temperature $T_c$ is derived by;

$$T_c=T_c^{(k)}$$

Figure 5:
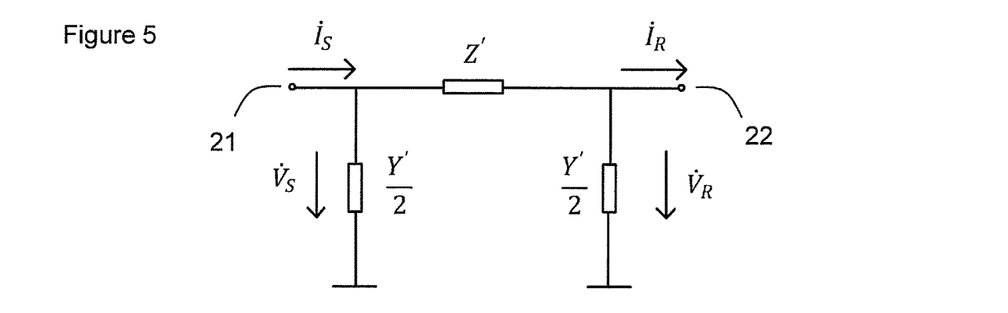
FIG. 5 shows a positive sequence equivalent PI circuit diagram of a three phase power line.

FIG. 5 shows the positive sequence equivalent PI circuit diagram of a three phase power line with the sending and receiving ends 21, 22 labelled. Z' and Y' are the equivalent impedance and admittance of the equivalent PI circuit, as will be understood by those skilled in the art.

Firstly, based on FIG. 5, it will be appreciated that the average conductor current, I, can be calculated (for example by element 44), whereby;

$$I = \left(\dot{I}_S - \frac{Y'}{2}\dot{V}_S + \dot{I}_R + \frac{Y'}{2}\dot{V}_R\right)\bigg/2$$

Or by a simplified equation;

$$I=(\dot{I}_S+\dot{I}_R)/2$$

where $$Z' = Z_c\sinh(\gamma l)$$

$$Y' = \frac{2}{Z_c}\tanh\left(\frac{\gamma l}{2}\right)$$

$$\gamma(T_c)=\sqrt{(r(T_{REF})(1+\varepsilon)(1+\alpha(T_c-T_{REF}))+j\omega L_u)(j\omega C_u)}$$

$$Z_c(T_c)=\frac{}{\sqrt{((r(T_{REF})(1+\varepsilon)(1+\alpha(T_c-T_{REF}))+j\omega L_u))/(j\omega C_u)}}$$

In one or more embodiments, $\gamma$ and $Z_c$ may alternatively be determined by the following equations:

$$\gamma=\sqrt{(r+j\omega L_u)(j\omega C_u)}$$

$$Z_c=\sqrt{(r+j\omega L_u)/(j\omega C_u)}$$

$\gamma$ is the propagation constant of the power line conductor;
$Z_c$ is a characteristic impedance of the power line conductor
r is series resistance per unit length of the power line conductor;
$\omega$ is frequency in radians where $\omega=2\pi f$,
$L_u$ is the (series) inductance per unit length of the power line conductor;
$C_u$ is the (shunt) capacitance per unit length of the power line conductor.

Tc has already been obtained by the previous step.

The estimated real time conductor temperature $T_C$ and average current I are passed at 38, 39 to the second stage 32 or steady state conductor temperature determination stage.

The Second Stage 32

The second stage comprises the determination of the steady state conductor temperature $T_{css}$ from the estimated real time conductor temperature $T_c$.

Figure 6:
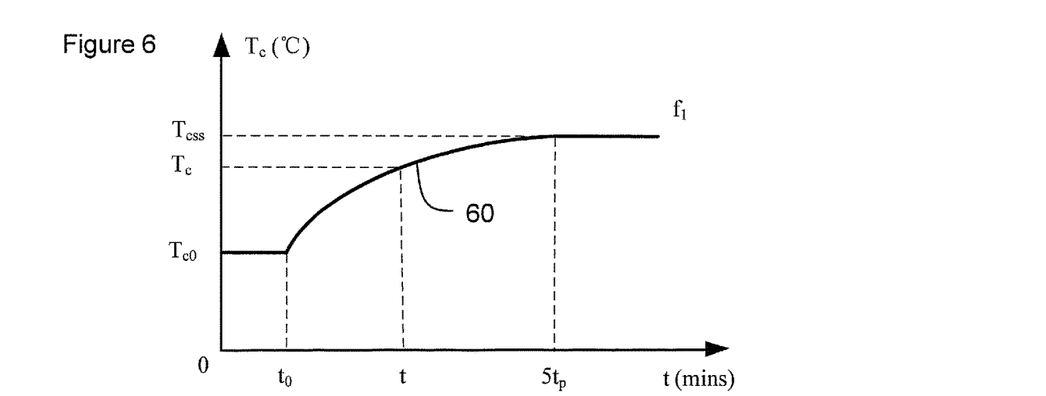
FIG. 6 shows a typical thermal model for any power line.

FIG. 6 shows a typical thermal model for any power line. When the current on a power line has a step change, the conductor temperature 60 on the power line will react to the change of current and change from one steady state to a new steady state exponentially. There is mathematical relationship between the real time conductor temperature $T_c$ and the steady state conductor temperature that will be reached over time. Therefore, the real time conductor temperature calculated in the first stage 31 can be used to predict the steady state conductor temperature.

Figure 7:
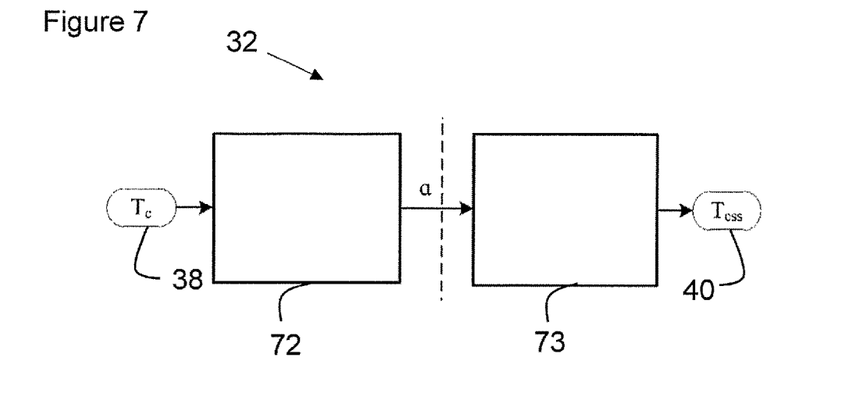
FIG. 7 shows a more detailed schematic view of the second stage shown in FIG. 3.

FIG. 7 shows a schematic diagram representative of the steps 72 and 73 performed by the second stage 32.

Step 72 comprises determining the derivative of the real time conductor temperature using the following formulas;

$$T_{cv}(k) = \frac{T_c(k) + T_c(k-1)}{2}$$

$$T'_c(k) = \frac{T_c(k) - T_c(k-1)}{T_{s1}}$$

where $T_{s1}$ is the primary execution time interval of the first stage 31 (for example, $T_{s1}$ can be selected as 5 s) i.e. $T_{s1}$ is the time interval between the $T_c$(k-1)th and $T_c$(k)th value; $T_c$(k-1) is the conductor temperature at $(k-1)^{th}$ time interval; and $T_c(k)$ is the conductor temperature at $(k)^{th}$ time interval (present time).

$T'_c(k)$ is the derivative of $T_c(k)$.

Then step 72 comprises calculating the exponentially decaying time constant $\alpha$. $\alpha$ can be calculated using several methods.

A first method comprises using the following equation;

$$\alpha(k) = -\frac{2}{T_{S2}} \cdot \frac{T_c(k) + T_c(k-2) - 2T_c(k-1)}{T_c(k) - T_c(k-2)}$$

A second method comprises using the following equation;

$$\alpha(k) = -\frac{T'_c(k) - T'_c(k-1)}{T_{cv}(k) - T_{cv}(k-1)}$$

where $T_{s2}$ is the secondary execution time interval of the second stage 32. For example, $T_{s2}$ can be selected as 10 s. The k is the present time sample and k−1 is the previous time sample, within the time interval $T_{s2}$. Once $\alpha$ is calculated, it may be checked against a predetermined condition to determine it reasonability. The following "judgment algorithm" may be applied to determine the reasonability of a. It will be appreciated that the k and k−1 values below are based on the secondary execution time interval.

If $a(k) \in [\alpha_{min}, \alpha_{max}]$, then the calculation result of a(k) is accepted.

If not, then a(k) maintains the previous value.

$$\alpha(k) = \alpha(k-1)$$

$[\alpha_{min}, \alpha_{max}]$ is an operating range of a and may be predetermined. For example, in the present apparatus, $\alpha_{min}$ is set as 0 and $\alpha_{max}$ is set as 2. It will be appreciated that other ranges may be selected. This parameter is a reflection of the thermal time constant of a power line. It is mainly related to the type of the material of the conductor, the wind pattern in an area (strong wind area/weak wind area), etc. In practice, if the above information is inaccessible, then the range may be set as wide as possible. However, it is preferable to narrow down the range during site commissioning.

Step 73 comprises the determination of the steady state conductor temperature $T_{css}$ by the following process;

If $|\Delta T_c| < \varepsilon$ $$T_{css}(k) = T_{cv}(k)$$

If not $$T_{css}(k) = \frac{1}{\alpha(k)} T'_c(k) + T_{cv}(k)$$

where $\Delta T_c$ is the difference between two successively calculated real time conductor temperature values, $T_c$, $$\Delta T_c = T_{cv}(k) - T_{cv}(k-1)$$

$\varepsilon$ is a predetermined threshold value, which may be a small value, and represents a limit in the change of conductor temperature for there to be deemed a steady state condition has been reached. For example, $\varepsilon$ is set as 0.02° C. in the present apparatus 1.

A further "judgement algorithm" may be applied to determine the reasonability of $T_{css}(k)$.

If $T_{css}(k) \in [T_{css\_min}, T_{css\_max}]$, then the calculation result of $T_{css}(k)$ is acceptable.

If not, then $T_{css}(k)$ maintains the previous value.

$$T_{css}(k) = T_{css}(k-1)$$

$[T_{css\_min}, T_{css\_max}]$ is the operating range of $T_{css}(k)$. For example, in the present apparatus 1, $T_{css\_min}$ is set as 0 and $T_{css\_max}$ is set as $2*T_{max}$ where $T_{max}$ is a predetermined maximum conductor temperature on the power line.

In this way, the steady state conductor temperature $T_{css}$ is determined and provided at output 40. The average current value, I, may be forwarded to the third stage 33.

The Third Stage 33

The third stage 33 comprises the determination of the maximum allowable conductor current based on the steady state conductor temperature $T_{css}$ and the average current I.

Figure 8:
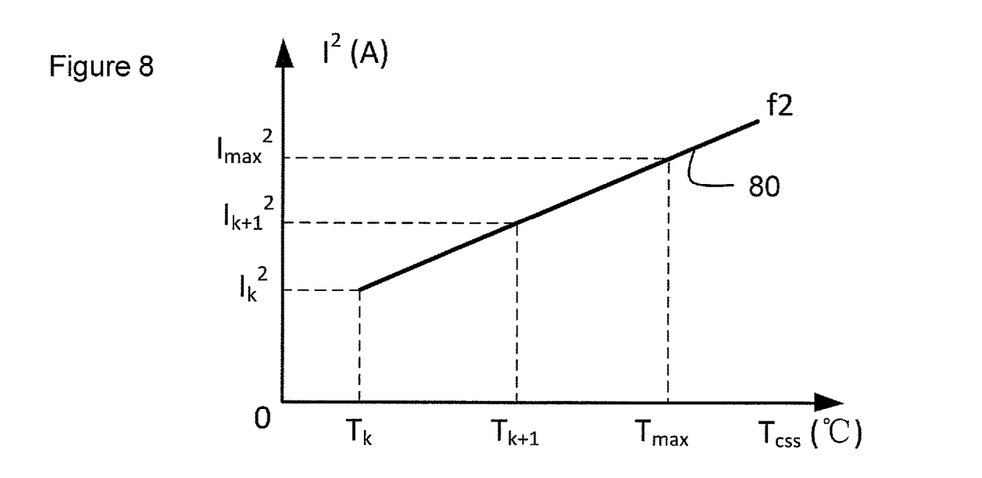
FIG. 8 shows a linear relationship between the squared conductor current ($I^2$) and a steady state conductor temperature ($T_{css}$).

FIG. 8 shows the relationship 80 between the squared conductor current ($I^2$) and the steady state conductor temperature ($T_{css}$). This relationship may be utilized in the equations below.

The maximum current rating $I_{max}$ is then determined by the third stage 33. The maximum current rating may be determined based on one or more of the following;

the steady state temperature value $T_{css}$ relative to the maximum conductor temperature $T_{max}$; the difference between the maximum conductor temperature $T_{max}$ and an initial steady state temperature value $T_{c0}$, relative to the difference between a current steady state temperature value and the initial steady state temperature value $T_{c0}$; the difference between the maximum conductor temperature $T_{max}$ and a first steady state temperature value $T_{css}(k-g)$, (where g may be 1, 2, 3 etc.) relative to the difference between a subsequent steady state temperature value $T_{css}(k)$ and the first steady state temperature value; and a change in the average conductor current, I, between the time of the first steady state temperature value and the time of the subsequent steady state temperature value.

In particular, the third stage 33 may be configured to determine one or more of the following variables for use as judgment conditions in three different cases for the calculation of $I_{max}$. For all the expressions and equations below, the time interval of samples at the kth and (k-1)th time is $T_{S3}$, are based on the tertiary execution time interval of stage 33 unless previously stated otherwise. For example, $T_{S3}$ can be selected as 20 s.

$\Delta I$ is the difference between two successively determined average conductor currents, where k-1 represents a first determined value and k a subsequent determined value;

$$\Delta I = I_k - I_{k-1}$$

$\Delta T_{css}$ is the difference between two successively determined steady state conductor temperatures where k-1 represents a first determined value and k a subsequent determined value;

$$\Delta T_{css} = T_{css}(k) - T_{css}(k-1)$$

$T_{c0}$ is the initial steady state conductor temperature when there is no current flowing in the power line.

$\Delta T_{c0}$ is the difference of two successive initial steady state conductor temperature, $$\Delta T_{c0} = T_{c0}(k) - T_{c0}(k-1)$$

$\varepsilon 1$, $\varepsilon 2$, $\varepsilon 3$ and $\varepsilon 4$ are all predetermined threshold values that control the determination of $I_{max}$ based on the values determined by the first stage 31 and second stage 32. For example, in one example, $\varepsilon 1$ is set as 0.1 kA, $\varepsilon 2$ is set as 0.1° C., $\varepsilon 3$ is set as 0.1° C., and $\varepsilon 4$ is set as 5° C.

Thus, the third stage 33 is configured to calculate $I_{max}$ in different ways depending on one or more conditions. In this example, three different ways to determine $I_{max}$ are provided and are described in the following three cases.

Case 1: If $|\Delta I| \leq \varepsilon 1$, $I_{max}(k)$ is calculated using the following equation:

$$I_{max}(k) = \sqrt{\frac{I_k^2 (T_{max} - T_{c0}(k-1))}{T_{css}(k) - T_{c0}(k-1)}}$$

In the equation, $T_{max}$ is the maximum allowable conductor temperature. $T_{css}(k)$ is the calculated steady state conductor temperature at $(k)^{th}$ time interval. $I_k$ is the average conductor temperature at $(k)^{th}$ time interval.

Case 2: If $|\Delta I| \geq \varepsilon 1$ and $|\Delta T_{css}| \leq \varepsilon 2$, $I_{max}(k)$ maintains the historic value.

$$I_{max}(k) = I_{max}(k-1)$$

Case 3: If $|\Delta I| \geq \varepsilon 1$ and $|\Delta Tcss| \geq \varepsilon 2$ the maximum current rating is calculated using the following equation:

$$I_{max}(k) = \sqrt{I_k^2 + \frac{I_k^2 - I_{k-1}^2}{T_{css}(k) - T_{css}(k-1)} (T_{max} - T_{css}(k))}$$

In addition, in Case 3, the value of $T_{c0}(k)$ is updated using the following equation;

$$T_{c0}(k) = T_{css}(k) - \frac{I_k^2(T_{css}(k) - T_{css}(k-1))}{I_k^2 - I_{k-1}^2}$$

However, this updated value of $T_{c0}(k)$ may be checked for reasonability against at least one predetermined condition. In particular, If $T_{c0}(k) \in [T_{c0\_min}, T_{c0\_max}]$ and $|\Delta T_{c0}| \le \varepsilon 4$, then the calculated $T_{c0}(k)$ is acceptable. $[T_{c0\_min}, T_{c0\_max}]$ is a predetermined operating range of $T_{c0}$. For example, in one example, $T_{c0\_min}$ is set at 0° C. and $T_{c0\_max}$ is set at 30° C. If not, $T_{c0}(k)$ maintains the historical value.

$$T_{c0}(k) = T_{c0}(k-1)$$

Through the above three cases, $I_{max}(k)$ can be calculated and then provided for control of the power/current applied to the power line section 20. In practice, to insure the calculated $I_{max}$ will not infringe the actual maximum allowable current of the power line at all times, the calculated $I_{max}$ may be multiplied by a coefficient before providing control of the power/current to the power line. This coefficient can be termed as the reliability coefficient as it insures the reliability of the dynamic line rating method. The reliability coefficient should be in the range of 0 to 1. For example, it can be selected as 0.9.

In other examples, the $I_{max}(k)$ value calculated above may be subject to a reasonability check prior to being provided for control of the power/current applied to the power line section 20. In particular, the calculated $I_{max}(k)$ value may be checked that it lies within predetermined bounds. An example maximum current rating judgment algorithm that may be used to determine the reasonability of the calculated $I_{max}(k)$ is as follows;

If $I_{max}(k) \in [I_{max\_min}, I_{max\_max}]$, then the calculation result of $I_{max}(k)$ is acceptable.

If not, then $I_{max}(k)$ maintains the historical value.

$$I_{max}(k) = I_{max}(k-1)$$

$[I_{max\_min}, I_{max\_max}]$ is the operating range of $I_{max}(k)$. For example, in one example, $I_{max\_min}$ is set as 0 kA and $I_{max\_max}$ is set as 5 kA.

The above three stages 31, 32, 33 make up a complete calculation loop. In this way, the maximum current rating of a power line can be predicted. The apparatus 1 may be integrated into a power line protection device, which may or may not be already present on the power line 20. Alternatively, the apparatus 1 may be integrated with a supervisory control and data acquisition (SCADA) system of the power line section 20. It will be appreciated that the term "power line section" may refer to a portion of or all of the power line. The apparatus 1 is shown conceptually comprising three stages in the above description. However, it will be appreciated that any number of calculation/determination stages may be provided to perform the above steps and the steps/stages may be combined rather than following a stepwise determination of the real time conductor temperature, steady state conductor temperature and maximum current rating. The above description comprises an implementation on a power line transmitting Alternating Current (AC). This invention can be applied to a power line transmitting Direct Current (DC) as well.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A dynamic line rating determination apparatus configured to provide for the control of the current applied to a power line conductor by determination of a dynamic maximum current rating for said power line conductor, the apparatus configured to;
   based on a set of measured voltage and current phase vectors taken at, at least two temporally spaced sample times, the voltage and current phase vectors comprising;
   a voltage phase vector for each phase of electrical power carried by the power line conductor at a first end of the power line conductor;
   a voltage phase vector for each phase of electrical power carried by the power line conductor at a second end of the power line conductor;
   a current phase vector for each phase of electrical power carried by the power line conductor at a first end of the power line conductor; and
   a current phase vector for each phase of electrical power carried by the power line conductor at a second end of the power line conductor;
   determine the dynamic maximum current rating by;
   applying said set of voltage and current phase vectors to a predetermined power line model to determine an estimate of the real time conductor temperature,
   applying said estimate of the real time conductor temperature to a predetermined thermal model to determine a prediction of a steady state temperature that the power line conductor will reach over time, and
   calculating the dynamic maximum current rating based on at least said prediction of the steady state temperature, a power line conductor current, and a maximum temperature limitation value.

2. An apparatus according to claim 1, wherein a set of positive sequence components, derived by a method of symmetrical components, of the voltage and current phase vectors is applied to the predetermined power line model, the set of positive sequence components comprising;
   a positive sequence voltage component for the first end;
   a positive sequence voltage component for the second end;
   a positive sequence current component for the first end; and
   a positive sequence current component for the second end.

3. An apparatus according to claim 1, wherein the set of positive sequence components are determined based on the following equation;

$$[\dot{V}_S \quad \dot{I}_S \quad \dot{V}_R \quad \dot{I}_R] = \frac{1}{3}[1 \quad \alpha \quad \alpha^2] \begin{bmatrix} \dot{V}_{Sa} & \dot{I}_{Sa} & \dot{V}_{Ra} & \dot{I}_{Ra} \\ \dot{V}_{Sb} & \dot{I}_{Sb} & \dot{V}_{Rb} & \dot{I}_{Rb} \\ \dot{V}_{Sc} & \dot{I}_{Sc} & \dot{V}_{Rc} & \dot{I}_{Rc} \end{bmatrix}$$

where,
   $\dot{V}_S$ and $\dot{I}_S$ are the positive sequence voltage and current components of the first end;

$\dot{V}_R$ and $\dot{I}_R$ are the positive sequence voltage and current components of the second end;

$\dot{V}_{Sa}$, $\dot{V}_{Sb}$ and $\dot{V}_{Sc}$ are the voltage phase vectors for each phase a, b, c at the first end;

$\dot{I}_{Sa}$, $\dot{I}_{Sb}$, and $\dot{I}_{Sc}$ are the current phase vectors for each phase a, b, c at the first end;

$\dot{V}_{Ra}$, $\dot{V}_{Rb}$ and $\dot{V}_{Rc}$ are the voltage phase vectors for each phase a, b, c at the second end;

$\dot{I}_{Ra}$, $\dot{I}_{Rb}$ and $\dot{I}_{Rc}$ are the current phase vectors for each phase a, b, c at the second end;

α is an operator of the transformation and is defined as;

$$\alpha = e^{\frac{2}{3}\pi j}$$

j is the imaginary unit.

4. The apparatus of claim 1 wherein the apparatus is configured to;

determine the estimate of the real time conductor temperature Tc based on the predetermined power line model represented in the equation below;

$$\begin{bmatrix} \dot{V}_S \\ \dot{I}_S \end{bmatrix} = \begin{bmatrix} A(T_c) & B(T_c) \\ C(T_c) & D(T_c) \end{bmatrix} \begin{bmatrix} \dot{V}_R \\ \dot{I}_R \end{bmatrix}$$

where, $A(T_c)=D(T_c)=\cos h(\gamma l)$ $B(T_c)=Z_c \sin h(\gamma l), C(T_c)=\sin h(\gamma l)/Z_c$ $l(T_c)=l(T_{REF})(1+\varepsilon)$ $\gamma(T_c)=\sqrt{(r(T_{REF})(1+\varepsilon)(1+\alpha(T_c-T_{REF}))+j\omega L_u)(j\omega C_u)}$ or $\gamma=\sqrt{(r+j\omega L_u)(j\omega C_u)}$ $Z_c(T_c)=\sqrt{((r(T_{REF})(1+\varepsilon)(1+\alpha(T_c-T_{REF}))+j\omega L_u))/(j\omega C_u)}$ or $Z_c=\sqrt{(r+j\omega L_u)/(j\omega C_u)}$ and r is series resistance per unit length of the power line conductor;

γ is the propagation constant of the power line conductor;

l is a length of the power line conductor;

$Z_c$ is a characteristic impedance of the power line conductor;

$T_{REF}$ is a reference conductor temperature and $r(T_{REF})$ is the resistance per unit length of the power line conductor at the temperature of $T_{REF}$;

ε is a predetermined elongation parameter of the power line conductor;

j is the imaginary unit,

□ is the angular frequency of the voltage/current where ω=2πf;

$L_u$ is the inductance per unit length of the power line conductor; and $C_u$ is the capacitance per unit length of the power line conductor.

5. The apparatus of claim 2, wherein the apparatus is configured to determine the power line conductor current, I, as an average of a power line conductor current, by the following equation;

$$I = \left( \dot{I}_S - \frac{Y'}{2}\dot{V}_S + \dot{I}_R + \frac{Y'}{2}\dot{V}_R \right)/2$$

or by the equation;

$I=(\dot{I}_S+\dot{I}_R)/2$ where, $\dot{V}_S$ and $\dot{I}_S$ are the positive sequence voltage and current components of the first end;

$\dot{V}_R$ and $\dot{I}_R$ are the positive sequence voltage and current components of the second end; and $$Y' = \frac{2}{z_c}\tanh\left(\frac{\gamma l}{2}\right)$$

$\gamma(T_c)=\sqrt{(r(T_{REF})(1+\varepsilon)(1+\alpha(T_c-T_{REF}))+j\omega L_u)(j\omega C_u)}$ or $\gamma=\sqrt{(r+j\omega L_u)(j\omega C_u)}$ $Z_c(T_c)=\sqrt{((r(T_{REF})(1+\varepsilon)(1+\alpha(T_c-T_{REF}))+j\omega L_u))/(j\omega C_u)}$ or $Z_c=\sqrt{(r+j\omega L_u)/(j\omega C_u)}$.

6. An apparatus according to claim 5, wherein the apparatus is configured to determine the elongation parameter by any one of the following methods;

i) $\varepsilon = \frac{F}{A \cdot E} + (\beta_1(T_c - T_{REF}) + \beta_2(T_c - T_{REF})^2)$; and ii) $\varepsilon = \frac{F}{A \cdot E} + \beta_1(T_c - T_{REF})$ where F is the mechanical force that is applied to the conductor in N, such as the force due to the weight of the power line conductor between support points;

A is the cross-sectional area in mm2 of the power line conductor;

E is the elasticity modulus in Nmm-2 of the power line conductor;

β_1 is the linear thermal expansion coefficient in K−1 of the power line conductor; and β_2 is the square thermal expansion coefficient in K−2 of the power line conductor.

7. An apparatus according to claim 4, wherein, based on the power line model, the estimate of the real time conductor temperature Tc is derived using a non-linear least squares method.

8. An apparatus according to claim 1, wherein the apparatus being configured to apply said estimate of the real time conductor temperature to the predetermined thermal model to determine a prediction of a steady state temperature that the power line conductor will reach over time comprises;

determining a time constant representative of a predicted change in real time conductor temperature over time based on a time derivative of at least two calculated real time conductor temperatures at different times and using said time constant to determine the steady state temperature.

9. An apparatus according to claim 8, wherein the apparatus is configured to determine the steady state conductor temperature Tcss by the following process;
1) If $|\Delta T_c| < \varepsilon$ $$T_{css}(k)=T_{cv}(k)$$

2) If not $$T_{css}(k) = \frac{1}{\alpha(k)}T'_c(k) + T_{cv}(k)$$

where $\Delta T_c$ is the difference between two successively calculated real time conductor temperature values, $T_c$, $$\Delta T_c = T_{cv}(k) - T_{cv}(k-1)$$

$\varepsilon$ is a predetermined threshold value representative of a limit in the change of conductor temperature for there to be deemed a steady state condition has been reached;
$T_C'(k)$ is a time derivative of $T_C(k)$, the estimated real time conductor temperature at time k; and
$T_{cv}$ is the average of the present and the previous value of $T_c$, $T_c(k)$ and $T_c(k-1)$.

10. An apparatus according to claim 1 wherein, the apparatus is configured to calculate the dynamic maximum current rating based on one or more of the following;
   i. the predicted steady state temperature value $T_{css}$ relative to the predetermined maximum temperature limitation value $T_{max}$;
   ii. the difference between the predetermined maximum temperature limitation value $T_{max}$ and a first steady state temperature value $T_{c0}$, relative to the difference between a subsequent steady state temperature value and the first steady state temperature value $T_{c0}$;
   iii. the difference between the predetermined maximum temperature limitation value $T_{max}$ and a first steady state temperature value $T_{css}(k-g)$, relative to the difference between a subsequent steady state temperature value $T_{css}(k)$ and the first steady state temperature value and a change in the average conductor current, I, between the time of the first steady state temperature value and the time of the subsequent steady state temperature value.

11. An apparatus according to claim 1 wherein the apparatus is configured to calculate the dynamic maximum current rating, I max(k), based on one or more of the following equations;

i) $I_{max}(k) = \sqrt{\dfrac{I_k^2(T_{max} - T_{co}(k-1))}{T_{css}(k) - T_{co}(k-1)}}$ ii) $I_{max}(k) = \sqrt{I_k^2 + \dfrac{I_k^2 - I_{k-1}^2}{T_{css}(k) - T_{css}(k-1)}(T_{max} - T_{css}(k))}$ where $T_{max}$ is a predetermined maximum temperature limitation value, $T_{css}(k)$ is the calculated steady state conductor temperature at $(k)^{th}$ time, $T_{c0}$ is the initial steady state conductor temperature when there is no current flowing in the power line, and $I_k$ is a power line conductor current, at a $k^{th}$ time, $I_{k-1}$ is a power line conductor current at a preceding $(k-1)^{th}$ time.

12. An apparatus according to claim 1 wherein the apparatus is configured to calculate the dynamic maximum current rating, $I_{max}$, based on; determination of one or more of the following variables for use as judgment conditions in one or more of three different cases, wherein,
$\Delta I$ is a difference between two successively determined conductor currents, where k-1 represents a first determined value and k a subsequent determined value;

$$\Delta I = I_k - I_{k-1}$$

$\Delta T_{css}$ is a difference between two successively determined steady state conductor temperatures where k-1 represents a first determined value and k a subsequent determined value;

$$\Delta T_{css} = T_{css}(k) - T_{css}(k-1)$$

$T_{c0}$ is an initial steady state conductor temperature when there is no current flowing in the power line;
$\Delta T_{c0}$ is the difference between two successive initial steady state conductor temperature, $$\Delta T_{c0} = T_{c0}(k) - T_{c0}(k-1)$$

$\varepsilon 1$, $\varepsilon 2$, $\varepsilon 3$ and $\varepsilon 4$ are all predetermined threshold values that control the determination of $I_{max}$; and
the dynamic maximum current rating $I_{max}$ is calculated by one or more of the following equations;
   i) if $|\Delta I| \leq \varepsilon 1$, $I_{max}(k)$ is calculated using the following equation:

$$I_{max}(k) = \sqrt{\dfrac{I_k^2(T_{max} - T_{c0}(k-1))}{T_{css}(k) - T_{c0}(k-1)}}$$

in the equation, $T_{max}$ is the maximum allowable conductor temperature, $T_{css}(k)$ is the calculated steady state conductor temperature at $(k)^{th}$ time interval, and $I_k$ is the average conductor temperature at $(k)^{th}$ time interval;
   ii) If $|\Delta I| \geq \varepsilon 1$ and $|\Delta T_{css}| \leq \varepsilon 2$, $I_{max}(k)$ maintains the historic value;

$$I_{max}(k) = I_{max}(k-1)$$

iii) If $|\Delta I| \geq \varepsilon 1$ and $|\Delta Tcss| \geq \varepsilon 2$ the maximum current rating $I_{max}(k)$ is calculated using the following equation:

$$I_{max}(k) = \sqrt{I_k^2 + \dfrac{I_k^2 - I_{k-1}^2}{T_{css}(k) - T_{css}(k-1)}(T_{max} - T_{css}(k))}.$$

13. An apparatus according to claim 1 wherein the apparatus is configured to check that the calculated dynamic maximum current rating $I_{max}(k)$ value lies within predetermined bounds prior to the apparatus providing it for control of current applied to the power line conductor.

14. A method of providing for the control of the current applied to a power line conductor by determination of a dynamic maximum current rating for said power line conductor, the method comprising;
   based on a set of measured voltage and current phase vectors taken at, at least two, temporally spaced sample times, the voltage and current phase vectors comprising;
   a voltage phase vector for each phase of electrical power carried by the power line conductor at a first end of the power line conductor;
   a voltage phase vector for each phase of electrical power carried by the power line conductor at a second end of the power line conductor;

a current phase vector for each phase of electrical power carried by the power line conductor at a first end of the power line conductor; and a current phase vector for each phase of electrical power carried by the power line conductor at a second end of the power line conductor;

determining the dynamic maximum current rating by;

applying said voltage and current phase vectors to a predetermined power line model to determine an estimate of the real time conductor temperature, applying said estimate of the real time conductor temperature to a predetermined thermal model to determine a prediction of a steady state temperature that the power line conductor will reach over time, and calculating the dynamic maximum current rating based on at least said prediction of a steady state temperature, a power, line conductor current, and a maximum temperature limitation value.

15. An electricity distribution grid or an electricity transmission grid including at least one power line conductor for carrying electrical power around said grid, the grid including the apparatus of claim 1 for controlling the power applied to said at least one power line conductor.

* * * * *